Sept. 17, 1968     J. L. FRITCH     3,401,445

GRAPPLING DEVICE

Filed April 10, 1967     2 Sheets-Sheet 1

INVENTOR
JUNIOR L. FRITCH
BY
Burton & Parker
ATTORNEYS

Sept. 17, 1968   J. L. FRITCH   3,401,445
GRAPPLING DEVICE
Filed April 10, 1967   2 Sheets-Sheet 2
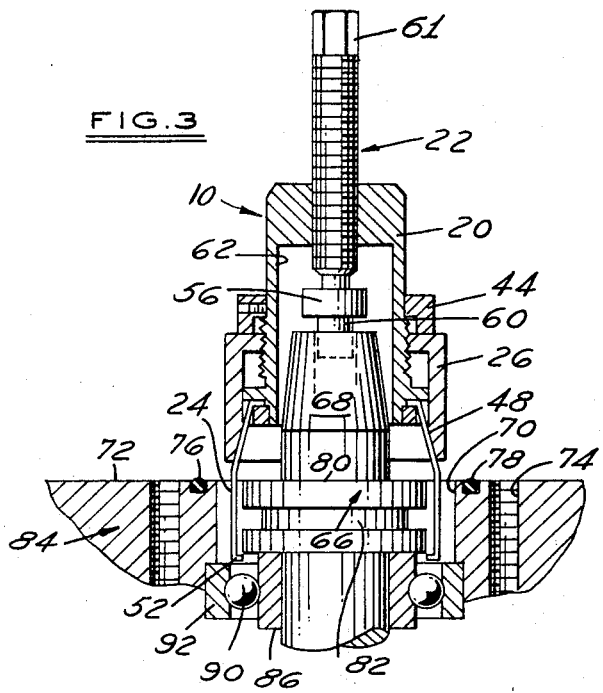
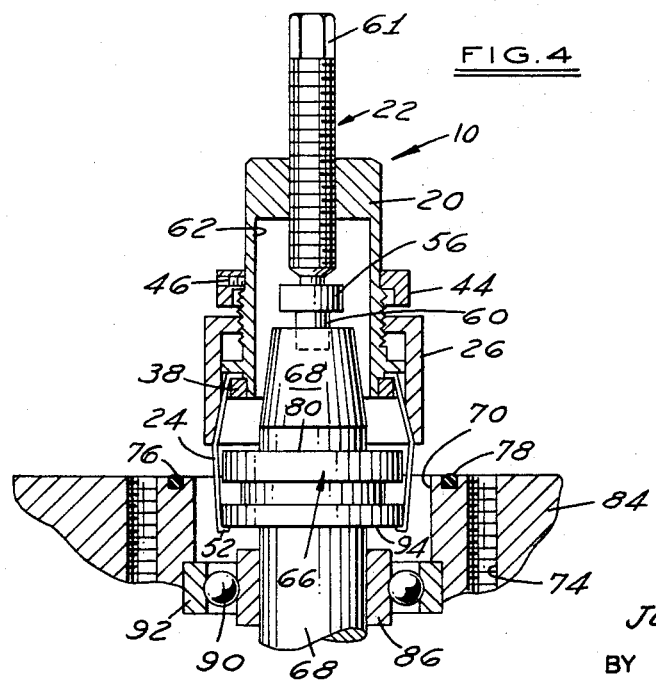
INVENTOR
JUNIOR L. FRITCH
BY
Burton & Parker
ATTORNEYS United States Patent Office 3,401,445
Patented Sept. 17, 1968

3,401,445
GRAPPLING DEVICE
Junior L. Fritch, Edgerton, Ohio, assignor to Robinair Manufacturing Corporation, Montpelier, Ohio, a corporation of Ohio
Filed Apr. 10, 1967, Ser. No. 629,710
7 Claims. (Cl. 29—261)

ABSTRACT OF THE DISCLOSURE

In general, the disclosure relates to a grappling device adapted to remove an annular seal from a shaft. The device has a body portion which threadably receives an axial stem, and a plurality of spring fingers which are retained to the body portion by a threaded nut. The hooked ends of the fingers are biased inwardly, behind the seal, by the nut, and the seal is removed from the shaft by threading the stem against the end of the shaft.

---

The grappling device of this invention is particularly, although not exclusively, adapted to remove a ring, such as an annular seal, from a shaft, wherein the access to the ring is restricted. For example, the crankshaft seal for an automotive air conditioner compressor may be disposed in aperture or recess defined in the compressor housing or casting, and the grappling means of this invention is adapted to remove the seal from the shaft without marring the shaft or the machined surfaces of the housing.

The crankshaft seal is presently removed with a small two-finger puller, or the seal is pried loose with a screwdriver or the like. This often results in marring of the compressor machined surfaces, causing leakage about the crankshaft seal.

Briefly, the grappling means of this invention includes a body portion having a stem shiftable in the axis of the body portion, a plurality of grappling fingers retained to the body portion, and a sleeve received on the exterior of the body portion, which is shiftable to simultaneously and uniformly bias the grappling fingers toward the axis of the body portion. The grappling fingers have hooked ends, which are received behind the ring which is to be removed from the shaft. The stem means is then shifted, relative to the body portion, to engage the end of the shaft and urge the ring, which is retained by the grappling fingers, from the shaft. In the embodiment of the grappling device shown in the drawings, the grappling fingers are resilient, and fixed at their inner end to the body portion, where they are received in a groove defined in the body portion. The resilient fingers extend from the body portion at an angle from the axis of the body portion, which is engaged by a complementary tapered portion of the sleeve or nut, to bias the fingers inwardly, upon movement of the nut toward the grappling fingers. The grappling fingers extend substantially parallel to the axis of the body portion from the end of the nut, to permit the grappling fingers to be received in a small or confined opening, such as the annular space defined about the seal in an automotive air conditioner compressor. In this embodiment, the grappling fingers are formed of thin metallic The stem, in the disclosed embodiment, is threadably received in an aperture defined in the body portion, and the end of the stem is provided with a swivelably connected pilot to assure co-axial alignment of the resilient grappling fingers, and prevent disengagement of the hooked ends upon movement of the stem relative to the shaft, or misalignment. The sleeve or nut may be threadably received on the exterior of the body portion, to assure uniform biasing of the fingers toward the axis of the body portion during engagement of the fingers with the crankshaft seal, or ring.

Other advantages, and meritorious features of this invention will more fully appear from the following specification, claims, and accompanying drawings, wherein:

FIGURE 3 is a partial cross sectional side view of the grappling device of this invention in position to remove a ring from the crankshaft of a compressor; and FIGURE 4 is a partial cross sectional side view of the grappling device of this invention, similar to FIGURE 3, with the ring partially removed.

Figure 1:
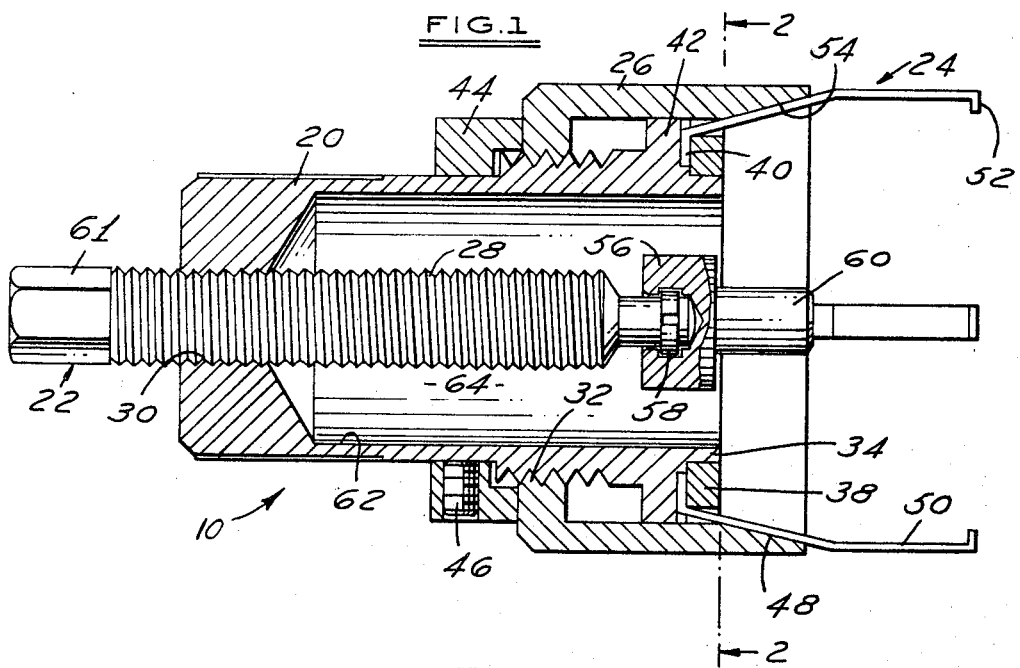
FIGURE 1 is a partial cross sectional side view of an embodiment of the grappling device of this invention.
Figure 2:
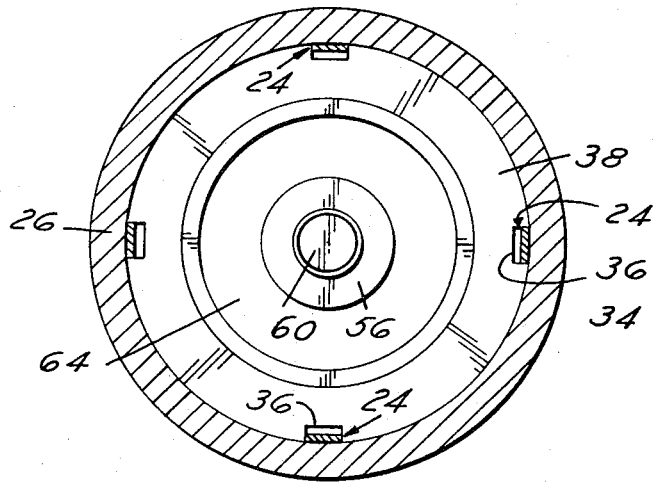
FIGURE 2 is an end cross sectional view of FIGURE 1, in the direction of view arrows 2—2.

The embodiment of the grappling device 10 shown in the drawings has a body portion 20, a stem 22, a plurality of grappling fingers 24, and a sleeve or nut 26. The stem has a threaded portion 28 which is threadably received in an aperture 30 substantially in the axis of the body portion. The sleeve 26 has a threaded end 32 which is threadably received on the exterior of the body portion adjacent the forward end 34.

The embodiment of the grappling device illustrated has four grappling fingers 24 which are received in slots 36 defined in the retainer or spacer ring 38, which may be made integral with the body portion by brazing, or the like. The end 40 of the grappling finger is received in a slot in the body portion, defined by the spacer ring 38 and an annular flange 42 defined on the body portion, and the grappling fingers are retained in the slot by the sleeve 26. The annular flange 42 also arrests forward threaded motion of the sleeve 26. A stop 44 has been provided in this embodiment to prevent the sleeve or nut from being threaded off of the threaded portion of the body portion, which would allow the grappling fingers to fall out of the slot. The stop 44 is retained to the body portion by a set screw 46.

In this embodiment of my invention, the grappling fingers are formed of resilient sheet material. The fingers extend from the body portion slot at an acute angle from the axis of the body portion, as shown at 48, to approximately the outer diameter of the sleeve or nut 26. The grappling fingers then extend generally parallel to the axis of the grappling device, as shown at 50, and the ends are hooked as shown at 52. The forward inner end of the sleeve is provided with a complementary tapered portion 54 which engages the angled portion 48 of the grappling fingers to bias the grappling fingers inwardly, as described hereinafter.

The stem 22 is provided with a swivel foot or pilot 56, which is swivelably secured to the end of the stem by a retainer ring 58. The end of the pilot 60 is adapted to be received in an aperture in the end of the shaft to provide co-axial alignment of the resilient grappling fingers, and prevent disengagement of the hooked ends 52 from the ring upon movement of the stem relative to the shaft, or misalignment between the shaft and the ring, or the like. The stem may be provided with an octagonal end 61 for engagement by a wrench, or the like. The body portion 20 is provided with a counterbore 62, which defines a chamber 64 adapted to receive the end of the shaft during removal of the ring or seal.

FIGURES 3 and 4 illustrate the function and operation of the grappling device when utilized to remove a sealing ring, generally indicated at 66, from the crankshaft 68 of a compressor, for example. It should be understood that the grappling device is generally adapted to remove a ring from a shaft in various environments, and the illustrated embodiment of an automotive compressor for an air conditioner unit is only one example of the function of my invention. In the embodiment of the compressor illustrated, the sealing ring 66 is received in a counterbore 70 of the compressor housing. A cover plate, not shown, is secured over the machined surface 72 by bolts received in the threaded apertures 74. The face of the compressor is sealed by an O-ring 76 received in recess 78. The forward face of the sealing ring 66, in this embodiment of the compressor, has a bearing carbon face 80, which seals the crankshaft opening against the inner face of the cover plate. An annular rubber sealing ring is provided beneath the carbon face, not shown, which is compressed against the shaft to seal the shaft within the housing, and retain the sealing ring to the shaft. The sealing assembly is also provided with a series of springs 82 which urges the seal assembly to expand and compresses the carbon seal face 80 against the inner surface of the cover plate. The tapered end of the shaft 68 extends through an aperture provided in the cover plate. The crankshaft is rotatably supported in the compressor housing 84 by a ball race assembly including an inner race 86, a plurality of balls 90, and an outer race 92 which is secured to the housing. The inner race 86 spaces the sealing ring 66 from the bearing assembly, and permits the hooked ends 52 of the grappling fingers to engage behind the sealing ring. It can be seen from the disclosed embodiment of the compressor that access to the sealing ring 66 is limited and conventional grappling devices, or the use of a screwdriver or the like to pry the sealing ring from the recess 70, would mar the machined surface of the counterbore 70 and the machined surface 72, permitting leakage about the O-ring 76, and through the aperture in the cover plate not shown.

The sealing ring 66 is removed from the crankshaft 68 by first threading the sleeve or nut 26 back until it engages the stop 44, which permits the resilient grappling fingers to extend substantially parallel to the axis of the grappling device, so that the grappling fingers may be received in the narrow annular opening about the sealing ring. The hooked ends of the grappling fingers 52 are relatively short to permit the movement of the fingers into the space between the sealing ring and the counterbore 70. It can be seen from FIGURE 3, that the stem 22 has been threadably retracted to prevent engagement between the pilot or swivel foot 60 and the end of the shaft 68. The end of the shaft 68 has been received in the counterbore 62 defined in the body portion, which aids in the alignment of the grappling device over the crankshaft.

The sleeve or nut 26 is then threaded forwardly to engage the tapered portion 48 of the grappling fingers, which biases the resilient fingers inwardly behind the end of the seal assembly 94, as shown in FIGURE 4. The threaded movement of the sleeve 26 uniformly and simultaneously urges all of the grappling fingers inwardly, and the resiliency of the fingers insures that all four of the fingers have engaged the sealing ring. The stem means is then threaded against the end of the shaft, and the relative movement of the stem and the body portion urges the seal from the shaft. The forward end of the pilot 60, in this embodiment, is received in a threaded aperture provided in the end of the crankshaft 68. The threaded aperture, in the assembled compressor, receives a bolt to secure a belt pulley, which is driven by the crankshaft of the automobile. The pilot cooperates with the resiliency of the grappling fingers to prevent disengagement of the hooked ends 52 of the grappling fingers during removal of the seal assembly. The threading of the stem is continued until the sealing ring may be removed from the shaft by merely lifting the grappling device from the shaft. The incremental movement of the sealing ring, and the alignment features of the grappling device prevent binding of the sealing ring as it is removed from the shaft.

It will be obvious to those skilled in the art that various materials may be utilized for the components of the grappling device of this invention. Spring steel, for example, may be used for the resilient grappling fingers 24, and steel may be used for the remainder of the components. The spacer ring 38 may be brazed to the body portion to prevent loss of temper of the resilient spring fingers, however other bonding means may be employed.

What is claimed is:

1. A grappling device, comprising: a body portion, a plurality of resilient grappling fingers fixed adjacent their inner ends to said body portion and extending beyond said body portion, said grappling fingers including an angled portion which extends at an acute angle from the axis of said body portion, and a sleeve telescopically received over said body portion and shiftable relative to said body portion to overlie and engage said angled portion of the grappling fingers and bias the ends of said grappling fingers toward the axis of said body portion to retain a member between the grappling fingers.

2. The grappling device defined in claim 1, characterized in that said sleeve has a tapered opening which overlies said angled portion of said grappling fingers and said tapered opening engages the angled portion of said fingers to bias the fingers inwardly upon shifting of said sleeve.

3. The grappling device defined in claim 1, characterized in that said grappling fingers are resilient thin metallic fingers having a hooked end, and extend substantially parallel to the axis of said body portion between said angled portion and said hooked ends.

4. The grappling device defined in claim 1, characterized in that said sleeve is threadably received on said body portion to incrementally bias said grappling fingers as the sleeve is threadably shifted on the body portion.

5. A grappling device defined in claim 1 adapted to remove a ring from a shaft, comprising: a body portion defining an open ended chamber adapted to receive the end of the shaft, a plurality of grappling fingers having hooked ends adapted to receive the ring, retained to said body portion, and extending beyond the open end of the chamber adapted to be biased inwardly to receive and retain the ring on the shaft, and a stem means shiftable generally in the axis of said body portion having an end received in said chamber adapted to engage the end of the shaft and remove the ring from the shaft.

6. The grappling device defined in claim 5, characterized in that said stem means has a pilot swivelably connected to the end thereof to assure co-axial alignment of the grappling fingers.

7. The seal puller defined in claim 1, characterized in that said resilient fingers are resilient thin metallic fingers having an end which is releasably received in a slot defined in said body portion.

References Cited

UNITED STATES PATENTS

| 1,109,942 | 9/1914 | Robbins | 29—258 X |
| 1,990,763 | 2/1935 | Walper | 145—46 |
| 3,063,140 | 11/1962 | Lydle | 29—261 |
| 3,246,391 | 4/1966 | Coleman | 29—275 X |

FOREIGN PATENTS

| 155,980 | 1/1921 | Great Britain. |

MYRON C. KRUSE, *Primary Examiner.*